United States Patent [19]

Meyer et al.

[11] Patent Number: 5,668,572
[45] Date of Patent: Sep. 16, 1997

[54] COLOR TEMPERATURE COMPENSATION FOR DIGITAL DISPLAY SYSTEM WITH COLOR WHEEL

[75] Inventors: Richard C. Meyer, Plano; Gerhard P. Deffner; Austin L. Huang, both of Dallas; Joseph K. Masters, Wylie, all of Tex.

[73] Assignee: Texas Instruments Incorporated, Dallas, Tex.

[21] Appl. No.: 451,387

[22] Filed: May 26, 1995

[51] Int. Cl.⁶ .................................................. H04N 9/31
[52] U.S. Cl. ................. 345/150; 348/655; 348/743; 348/742
[58] Field of Search .................. 348/655, 656, 348/657, 742, 743, 270; 345/150, 151; H04N 9/31, 9/12

[56] References Cited

U.S. PATENT DOCUMENTS

| | | | |
|---|---|---|---|
| 2,530,107 | 11/1950 | Webb | 348/743 |
| 2,921,118 | 1/1960 | Benjamin | 348/743 X |
| 3,582,960 | 6/1971 | Hilborn | 348/656 X |
| 5,079,544 | 1/1992 | DeMond et al. | 340/701 |
| 5,233,385 | 8/1993 | Sampsell | 355/35 |
| 5,428,408 | 6/1995 | Stanton | 348/742 |
| 5,448,314 | 9/1995 | Heimbuch et al. | 348/743 |

Primary Examiner—John K. Peng
Assistant Examiner—Nathan J. Flynn
Attorney, Agent, or Firm—Julie L. Reed; James C. Kesterson; Richard L. Donaldson

[57] ABSTRACT

A method of adjusting color temperature of images displayed by a display system (10) whose images are based on sequential pixel data and are filtered with a color wheel (15, 15', 15"). The relative display times for each color are adjusted to result in a corresponding adjustment of color temperature. In a first embodiment (FIG. 2), the size of the color wheel's segments are changed as well as the display times for data corresponding to each segment. In a second embodiment (FIG. 3), the display times for data corresponding to one or more segments are decreased with a black display time to fill in the difference.

18 Claims, 1 Drawing Sheet

COLOR TEMPERATURE COMPENSATION FOR DIGITAL DISPLAY SYSTEM WITH COLOR WHEEL

TECHNICAL FIELD OF THE INVENTION

This invention relates to image display systems, and more particularly to digital image display systems that use a color wheel.

BACKGROUND OF THE INVENTION

Image display systems based on spatial light modulators (SLMs) are an alternative to image display systems that are based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of an air gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, blue, then green data, alternatingly. A color wheel having three segments of these same colors is synchronized to the data so that as the data for each color is displayed by the SLM, the light incident on the SLM is filtered by the color wheel. For standard display rates, such as the 30 frame per second NTSC rate, the eye perceives the image as having the proper color.

Various modulation schemes can be used to vary the intensity of each color. For example, each pixel might have a 24-bit value, 8 bits for each color. This permits $2^8=256$ levels of intensity for each color, which includes a 0 value for no color (black). Then, for each color, the pixel can be on for a length of time for corresponding to its pixel value, and the combination of colors can provide a full color display.

For color displays, one aspect of picture quality is color temperature. This is a subjective evaluation, indicated by the "whiteness" of white. It is assumed by analogy to the photographic film industry, that color temperature preferences follow certain geographic patterns. For example, Americans seem to prefer a bluish white color temperature. Europeans seem to prefer whatever color temperature provides a "truest" skin tones. It is desirable for a color display system to be able to provide whatever color temperature is preferred in a given market.

SUMMARY OF THE INVENTION

One aspect of the invention is a method of adjusting the color temperature of a display generated by light filtered through a color wheel and represented by sequential pixel data for each color. The size of the segment of the color wheel corresponding to a dominant color is slightly increased, thereby providing a dominant color segment. During operation, the display time for the pixel data of the dominant color is increased by an amount of time proportionate to the increase in the size of the dominant color segment. The size of the segment of the color wheel corresponding to a non-dominant color is slightly decreased, thereby providing a non-dominant color segment. During operation, the display time for the pixel data of the non-dominant color is decreased by an amount of time proportionate to the decrease in the size of the non-dominant color segment. In a typical color wheel, which has three differently colored segments, one segment is the dominant segment and the other two segments are non-dominant segments.

In another embodiment of the invention, the segments of the color wheel are equal in size. However, the display times for non-dominant segments are decreased, and the decreases are taken up by providing no light through the color wheel.

An advantage of the invention is that color temperature may be customized for different markets. In general, the display system is configurable by electronically changing the relative optical efficiencies of the color wheel segments. In the embodiment where the color wheel is changed as well as the display times for the segments, the total color wheel efficiency is 100 per cent. In the embodiment where the same color wheel is used and only display times for the segments are changed, there is a slight loss in efficiency.

The addition of adjustable color temperature to the display system may be achieved without high additional cost. Also, because of the adjustability, larger manufacturing tolerances for color wheels are permissible, resulting in further cost reduction.

DETAILED DESCRIPTION OF THE INVENTION

Display System Overview

The following description is in terms of a display system that displays images generated by an SLM. However, the invention is not limited to SLM-based displays, and could be used with any display system that uses a color wheel for sequential color displays. For example, the display system might be based on an LCD display device. As another example, the data described herein could be converted to analog signal for use by a white light CRT whose images are filtered by a color wheel. Whether used digitally or converted to analog, the pixel data is "time modulated" in the sense that the display time for each color can be varied.

Figure 1:
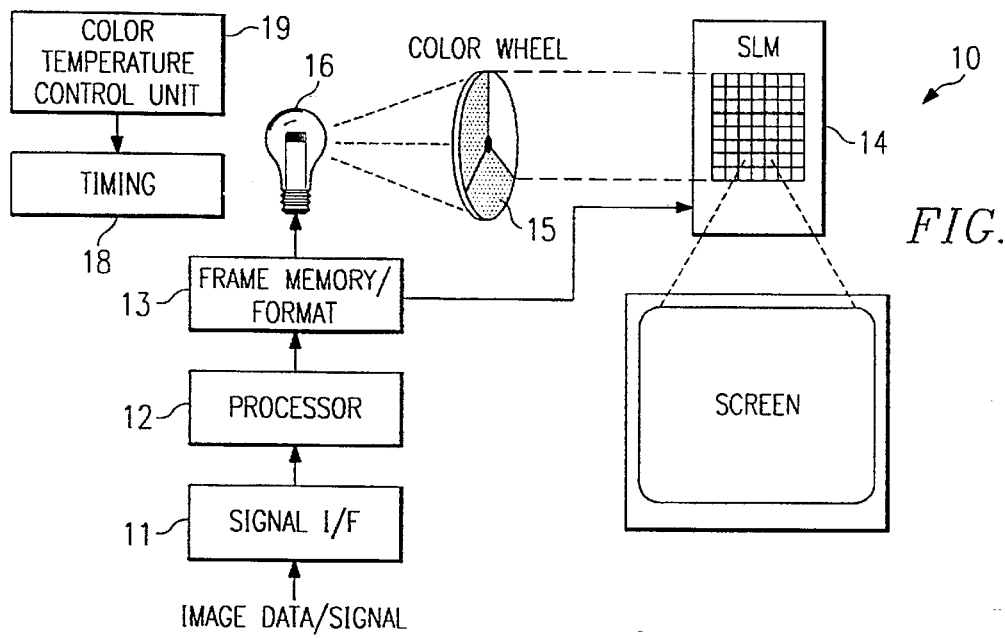
FIG. 1 is a block diagram of a display system having a color wheel configured and operated in accordance with the invention.

FIG. 1 is a block diagram of a typical SLM-based image display system 10 that uses a color wheel 15 in accordance with the invention. As explained below, the invention is directed to electronically controlling the display times of pixel data so that the color wheel 15 filters light to a desired color temperature.

The following overview of the various components of display system 10 provides details helpful to understanding of the invention. Further details pertaining to a DMD-based image display system with other types of color wheel systems are set out in U.S. Pat. No. 5,079,544, entitled "Standard Independent Digitized Video System"; U.S. Pat. No. 5,526,051, entitled "Digital Television System"; and in U.S. Pat. No. 5,452,024, entitled "DMD Display System". Further details describing the general operation of color wheels for SLM-based display systems are set out in U.S. Pat. No. 5,233,385, entitled "White Light Enhanced Color Field Sequential Projection"; U.S. Pat. No. 5,448,314, entitled "Method and Apparatus for Sequential Color Imaging"; and U.S. patent Ser. No. 08/339,379, entitled "Digital Motor Controller for Color Wheel". Each of these patents and patent applications is assigned to Texas Instruments Incorporated, and each is incorporated herein by reference.

Signal interface 11 receives some kind of input signal. For purposes of example herein, it will be assumed that the input signal is a standard analog video signal having horizontal and vertical synchronization components. However, in other systems, the input signal might be graphics data already in digital form.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 12 may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

Display memory 13 receives processed pixel data from processor 12. If the data is not already formatted by processor 12, display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by 8 bits for each of three colors, there will be 3×8=24 bit-planes per frame. Bit-planes containing less significant bits will result in shorter display times than the bit-planes containing more significant bits.

In a typical display system 10, memory 13 is a double-buffer memory, which means that it has a capacity for at least two display frames. The buffer for one display frame can be read out to SLM 14 while the buffer or another display frame is being written. The two buffers are controlled in a "ping-pong" manner so that data is continuously available to SLM 14.

SLM 14 may be any type of SLM. For purposes of example, this description is in terms of a display system whose SLM is a digital micro-mirror device (DMD). However, as stated above, the same concepts apply to display systems that use other types of SLMs or other image generating devices.

Light incident on SLM 14 is provided by a white light source 16 and is transmitted through a rotating color wheel 15. In the system of FIG. 1, SLM 14 is a reflective SLM (a DMD), and the color wheel 15 is used to filter the light before reflection. As an alternative, the color wheel 15 could be placed so that light is filtered after being emitted or reflected.

As explained in the Background, the data for each color are sequenced and the display of the data is synchronized so that the portion of color wheel 15 through which light is being transmitted to SLM 14 corresponds to the data being displayed. In the example of this description, each pixel is represented by an RGB data value, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 includes a motor, controlled by a motor controller that controls the speed and phase of color wheel 15. For example, the desired speed might be 60 revolutions per second to correspond to a 60 frame per second display rate. The phase is set so that the proper filter (red, green, or blue) of color wheel 15 is transmitting light from SLM 14 as the data for that filter is being displayed. To maintain a correct phase relationship between the color wheel 15 and the data being displayed, the color wheel 15 can speed up or slow down or the data can be delayed or skipped.

Master timing unit 18 provides various system control functions. One timing signal provided by master timing unit 18 is a signal defining the display times for each bit weight of the pixel value. As explained below in connection with FIG. 3, one embodiment of the invention is especially amenable to user-selected color temperature, via a color temperature control unit 19.

As explained above, for a DMD-based system, the data delivered to SLM 14 is in a special bit-plane format for pulse width modulation. Each red, green, and blue value of a pixel has n bits per frame. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

Where a frame of data is displayed for a frame period of T seconds, color wheel 15 has a period of revolution of T seconds. If each color were to be displayed for an equal time, the color wheel 15 would have equally sized segments of each color and the data for each color would then be displayed for T/3 seconds. The LSB period would be the frame time for each color divided by the number of LSB periods for that color. Thus, where all colors are treated the same, and where there are n bits per color, the LSB period would be calculated as follows:

$$\frac{T}{3(2^n-1)} \text{ seconds.}$$

For a 60 frame per second display, the frame period is approximately 16.7 milliseconds. For pixel data having 8 bits per color, each LSB time is 16.7 msec/3*255 or 21.8 microseconds, using approximate time values.

Figure 2:
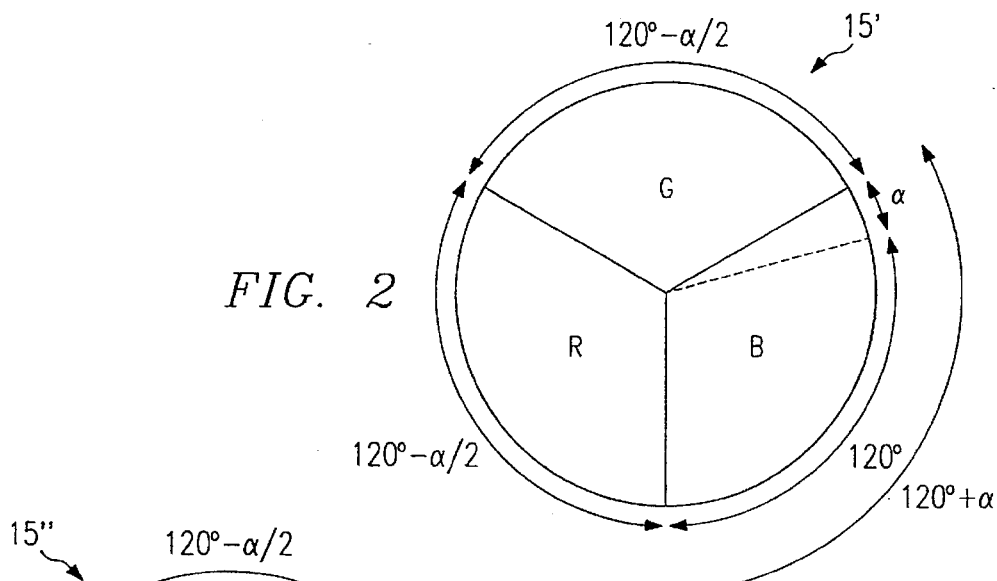
FIG. 2 illustrates a color wheel operated in accordance with a first embodiment of the invention.

FIG. 2 illustrates one method of using a color wheel 15' to adjust color temperature in accordance with the invention. In the example of FIG. 2, it is desired to have a bluish-white color temperature. For purposes of this description, blue is the "dominant" color. Red and green are "non-dominant" colors.

As illustrated, the blue segment of color wheel 15' has been enlarged. More specifically, whereas a color wheel having equally sized segments would have segments having a 120 degree arc size, the blue segment of color wheel 15' has been enlarged to 120+α degrees. The red and green segments have been decreased in size to 120−α/2 degrees.

Consistent with the enlargement of the blue segment, the time during which blue data is displayed is increased. The increase is proportionate to the increase in the size of the blue segment. The time during which red and green data is displayed is decreased, proportionate to the decrease in the size of the red and green segments.

The blue display time is calculated as follows:

$$\frac{T}{3} + \frac{\alpha T}{360} \text{ seconds,}$$

where alpha is the number of degrees that the blue segment has been increased. The red and green display times are calculated as follows:

$$\frac{T}{3} - \frac{\alpha/2\, T}{360} \text{ seconds.}$$

The increase and decrease of display times can be achieved by adjusting the LSB period (each time slice). Because each bit-plane then has a longer display time, this evenly spreads the change for each color throughout the display time for that color. However, other approaches are possible, such as changing the display times for only the bit-planes of more significant bits.

Where the LSB period is to be adjusted, the increase for the LSB period of blue data can be calculated as follows:

$$\frac{\alpha T}{360\,(2^n - 1)} \text{ seconds.}$$

It directly follows that the LSB period for the blue data is:

$$\frac{T}{3\,(2^n - 1)} + \frac{\alpha T}{360\,(2^n - 1)} \text{ seconds.}$$

For red and green data, the decrease for the LSB time is ½ the increase for the LSB time of blue data. Their LSB periods are calculated as:

$$\frac{T}{3\,(2^n - 1)} - \frac{\alpha/2\, T}{360\,(2^n - 1)} \text{ seconds.}$$

Figure 3:
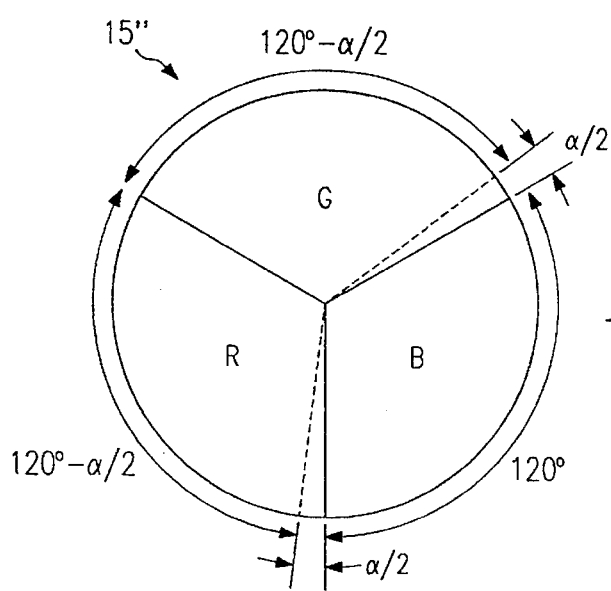
FIG. 3 illustrates a color wheel operated in accordance with a second embodiment of the invention.

FIG. 3 illustrates a second method of operating a color wheel 15" to adjust color temperature in accordance with the invention. As in the example of FIG. 2, it is desired to have a bluish-white color temperature. However, instead of changing the size of each segment as in the embodiment of FIG. 2, the display time for the two non-dominant colors of color wheel 15" is simply reduced.

All segments of the color wheel 15" are equal in size, having an arc of 120 degrees. However, the segment size of non-dominant colors is effectively reduced by not providing light through the color wheel for a portion of the segment. The result is that the image is black for a short period. This black image is easily integrated by the eye. In a DMD-based system, the black image is achieved by turning all mirror elements off.

More specifically, for color wheel 15", data for the dominant color (blue) is allocated ⅓ the total period of revolution. Thus, the display time for blue is T/3 and the LSB period for blue data is unaffected.

Where α/2 is the number of degrees that the red and green segments are decreased, their display times can be calculated as follows:

$$\frac{T}{3} - \frac{\alpha/2\, T}{360} \text{ seconds.}$$

The black image is displayed for a period of time equal to the decrease in display time, and is displayed during the missing display times for the non-dominant colors.

As in the embodiment of FIG. 2, the decrease in display time for a non-dominant color can be achieved by decreasing the LSB period or by some other adjustment to the display time for that color. If the LSB period is decreased, it is:

$$\frac{T}{3\,(2^n - 1)} - \frac{\alpha/2\, T}{360\,(2^n - 1)} \text{ seconds.}$$

A feature of the embodiment of FIG. 3 is that variations in color temperature do not require a physical change to the color wheel. The changes are solely to the timing of the data. Referring again to FIG. 1, a color temperature control unit 19 could be incorporated into the display system 10, which would permit a user to select a desired color temperature. It would then calculate the required display times for each color, and provide this information to master timing unit.

For both embodiments of the invention, variations on the amount of increase or decrease in display times could be made without departing from the basic concepts of the invention. For example, in the embodiment of FIG. 2, the decrease in segment size and display time of each non-dominant color need not be the same for each color. In fact, it is possible that the decrease could be all in one of the non-dominant colors. However, in order to maintain the same frame rate, the total decrease in display time for non-dominant colors is the same as the increase in display time for the dominant color. Likewise, in the embodiment of FIG. 3, the black display times need not be the same for the non-dominant colors, and could conceivably be from only one color.

Also, it is possible in both embodiments that there could be two dominant colors rather than one. In the embodiment of FIG. 2, the segment sizes and display times for two colors could be increased with a corresponding decrease in the segment size and display time for a third color. In the embodiment of FIG. 3, the display time for only one non-dominant color could be decreased.

It is possible that the color wheel might have its red, green, and blue segments in interleaved sections instead of contiguous segments. U.S. patent Ser. No. 08/179,028, incorporated by reference above, describes this technique as a method of reducing artifacts. In method of the present invention could be applied to the sections, with increases and decreases in section sizes and display times being allocated among the sections.

Finally, it is possible that the color wheel might have less than or more than three colors. Or the color wheel might have a white segment as described in U.S. Pat. No. 5,233,385, incorporated by reference above. The concepts described above would apply with appropriate modifications to account for the portion of the color wheel allocated to each color.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of adjusting the color temperature of a display generated by light filtered through a color wheel and represented by sequential pixel data for each color, comprising the steps of:

increasing the size of a segment of said color wheel corresponding to a dominant color, thereby providing a dominant color segment;

increasing the display time for the pixel data of said dominant color by an amount of time proportional to the increase in the size of said dominant color segment;

decreasing the size of a segment of said color wheel corresponding to a non-dominant color, thereby providing a non-dominant color segment;

decreasing the display time for the pixel data of said non-dominant color by an amount of time proportional to the decrease in the size of said non-dominant color segment.

2. The method of claim 1, wherein said pixel data is formatted in bit-planes, and wherein said step of increasing the display time and said step of decreasing the display time are achieved by adjusting the display time for one or more bit-planes.

3. The method of claim 2, wherein said display time is adjusted by increasing or decreasing the least significant bit (LSB) period.

4. The method of claim 1, wherein said increasing steps are performed with more than one dominant color.

5. The method of claim 1, wherein said decreasing steps are performed with more than one non-dominant color.

6. The method of claim 1, wherein said color wheel has segments for three different colors, and wherein said increasing steps are performed with one color and said decreasing steps are performed with two colors.

7. A method of adjusting the color temperature of a display generated by light filtered through a color wheel and represented by sequential pixel data for each color, comprising the steps of:

selecting at least one color of said color wheel as a dominant color;

decreasing the display time for pixel data of a non-dominant color; and providing a black display period for an amount of time equal to the decrease in the display time of said non-dominant color, during the time that pixel data of said non-dominant color would otherwise be displayed.

8. The method of claim 7, wherein said pixel data is formatted in bit-planes, and wherein said step of decreasing the display time is achieved by adjusting the display time for one or more bit-planes.

9. The method of claim 8, wherein said display times are adjusted by decreasing the least significant bit (LSB) period.

10. The method of claim 7, wherein said decreasing step is performed with more than one non-dominant color.

11. The method of claim 10, wherein said color wheel has segments for three different colors, and wherein said step is performed with two colors.

12. A color display system, comprising:

a signal interface for receiving an image data signal as pixel data in sequential color form or for converting said signal to pixel data in sequential color form;

a processor for receiving said pixel data from said signal interface, and for preparing said pixel data for display;

a frame memory for storing said pixel data;

a spatial light modulator for receiving said pixel data from said frame memory, and for generating sequential color images based on said pixel data;

a color wheel for filtering light incident to, or reflected by, said spatial light modulator, wherein said color wheel has a dominant-color segment larger than other segments; and a timing unit for defining display times for the pixel data corresponding to each color, such that pixel data corresponding to the dominant color is displayed for a longer period of time than pixel data corresponding to other colors of said color wheel.

13. The color display system of claim 12, wherein said color wheel has segments for three colors, such that said color wheel has one dominant-color segment and two non-dominant-color segments.

14. The color display system of claim 12, wherein said spatial light modulator is a digital micro-mirror device.

15. The color display system of claim 12, wherein said timing unit defines said display times by defining a least significant bit (LSB) period.

16. The color display system of claim 12, further comprising a formatter for receiving said pixel data from said processor and for formatting said pixel data into bit-plane format, and wherein said frame memory stores said pixel data in bit-plane format.

17. The color display system of claim 16, wherein said formatter is part of said processor.

18. The color display system of claim 16, wherein said formatter is part of said frame memory.

* * * * *